(12) United States Patent
Tsai (10) Patent No.: US 12,043,386 B2
(45) Date of Patent: Jul. 23, 2024

(54) WING ASSEMBLIES AND AIRCRAFT

(71) Applicant: The Boeing Company, Chicago, IL (US)

(72) Inventor: Kevin R. Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 9 days.

(21) Appl. No.: 17/967,766

(22) Filed: Oct. 17, 2022

(65) Prior Publication Data

US 2024/0124123 A1 Apr. 18, 2024

(51) Int. Cl.
*B64C 9/18* (2006.01)
*B64C 3/18* (2006.01)
*B64C 9/02* (2006.01)
*B64C 13/28* (2006.01)
*B64C 25/18* (2006.01)

(52) U.S. Cl.
CPC ............... *B64C 9/18* (2013.01); *B64C 3/187* (2013.01); *B64C 9/02* (2013.01); *B64C 13/28* (2013.01); *B64C 25/18* (2013.01)

(58) Field of Classification Search
CPC .... B64C 5/10; B64C 5/08; B64C 3/50; B64C 9/18; B64C 9/02
See application file for complete search history.

(56) References Cited

U.S. PATENT DOCUMENTS

| | | | | |
|---|---|---|---|---|
| 2,405,726 A * | 8/1946 | Zap | ........................... | B64C 9/16 244/216 |
| 2,502,315 A * | 3/1950 | Earhart | ..................... | B64C 9/16 244/216 |
| 2,620,147 A * | 12/1952 | Cook, Jr. | .................. | B64C 9/18 244/216 |
| 4,471,927 A * | 9/1984 | Rudolph | .................... | B64C 9/16 244/215 |
| 4,614,320 A * | 9/1986 | Rutan | ........................ | B64C 9/18 244/218 |
| 4,705,236 A * | 11/1987 | Rudolph | .................... | B64C 9/16 244/90 R |
| 4,784,355 A * | 11/1988 | Brine | ........................ | B64C 9/16 244/216 |
| 5,544,847 A * | 8/1996 | Bliesner | .................... | B64C 9/24 244/214 |
| 2016/0046365 A1 * | 2/2016 | González Gonzalbo | ..................... | B64C 25/34 244/13 |
| 2017/0327204 A1 * | 11/2017 | de Sousa | ............... | F16J 15/104 |

(Continued)

*Primary Examiner* — Tien Q Dinh
*Assistant Examiner* — William L Gmoser
(74) *Attorney, Agent, or Firm* — Kolitch Romano Dascenzo Gates LLC (57) ABSTRACT

Wing assemblies (100) comprise one or more wing support structures (24), an inboard-most flap (32), one or more flap supports (28) that operatively couple the inboard-most flap (32) to the one or more wing support structures (24), and one or more flap actuators (31) configured to operatively move the inboard-most flap (32) relative to the one or more flap supports (28). The flap support(s) (28) comprise at least an inboard-most inboard-flap support (106), the flap actuator(s) (31) comprise at least an inboard-most inboard-flap actuator (108) that is outboard of the inboard edge (102) of the inboard-most flap (32), and the inboard-most inboard-flap actuator (108) is spaced-away from the inboard-most inboard-flap support (106).

20 Claims, 8 Drawing Sheets

(56) References Cited

U.S. PATENT DOCUMENTS

2019/0176963 A1* 6/2019 Hsueh .................... B64C 13/34
2021/0114714 A1* 4/2021 Tsai ........................ B64C 9/06

* cited by examiner

WING ASSEMBLIES AND AIRCRAFT

FIELD

The present disclosure relates to wing assemblies and aircraft.

BACKGROUND

Flaps are high-lift devices used to reduce the stall speed of an aircraft and thus reduce the take-off and landing distances of an aircraft. Flaps are mounted along the trailing edges of the wings of aircraft. In large commercial aircraft, each wing often includes more than one flap, including an inboard-most flap that is positioned adjacent to the fuselage relative to one or more outboard flaps. Historically, in large commercial aircraft, inboard-most flaps are supported and actuated by structure internal to the fuselage. Such arrangements result in flap actuators that are not evenly spaced along the length of the flap and undesirable torques on the flap during actuation thereof.

SUMMARY

Wing assemblies comprise one or more wing support structures, an inboard-most flap, one or more flap supports, and one or more flap actuators. The inboard-most flap comprises an inboard edge and an outboard edge. The flap support(s) operatively couple the inboard-most flap to the wing support structures, and flap support(s) comprise at least an inboard-most inboard-flap support. The flap actuator(s) are configured to operatively move the inboard-most flap relative to the flap support(s) between a stowed position and a range of deployed positions. The flap actuator(s) comprise at least an inboard-most inboard-flap actuator that is outboard of the inboard edge of the inboard-most flap, and the inboard-most inboard-flap actuator is spaced-away from the inboard-most inboard-flap support.

DESCRIPTION

Figure 1:
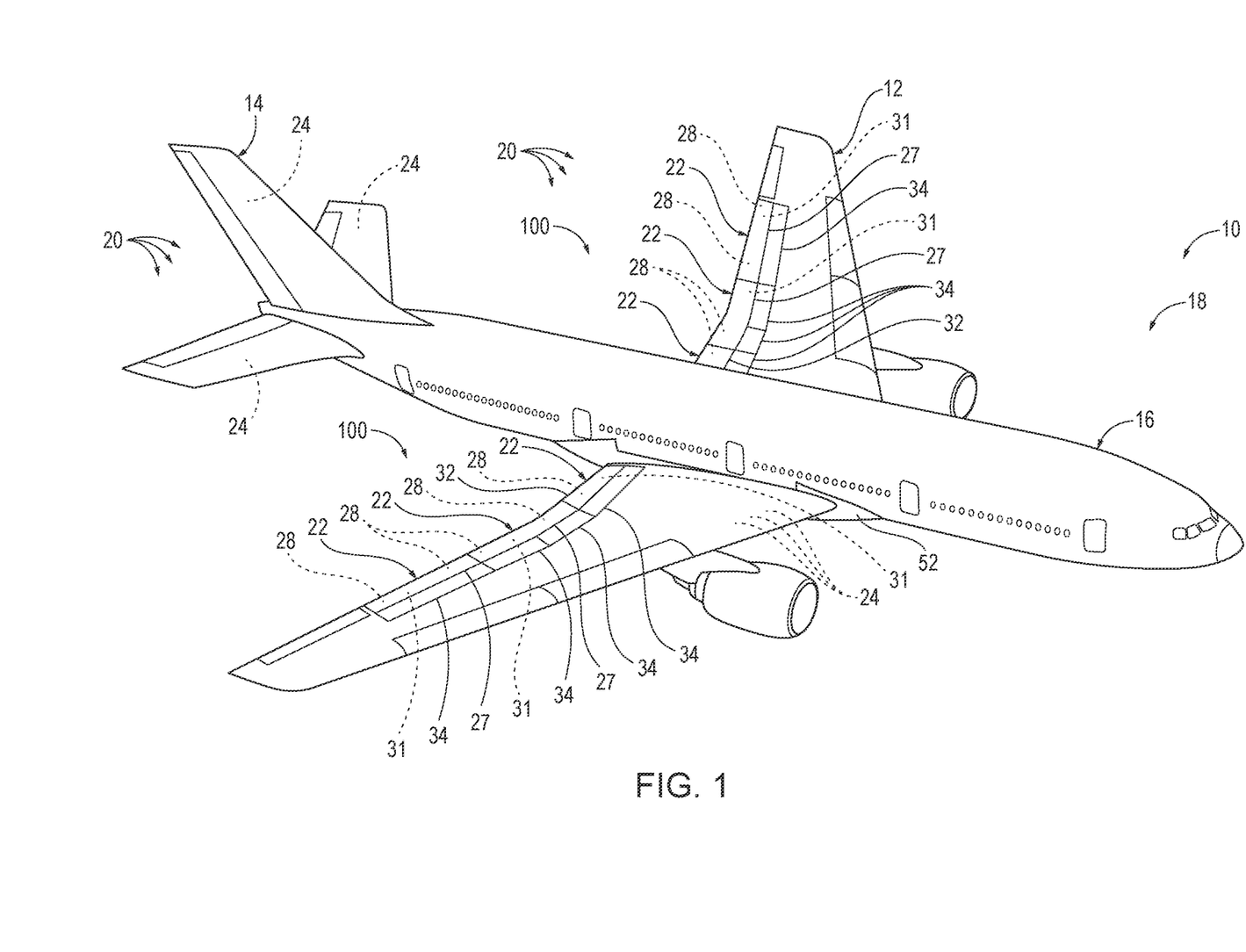
FIG. 1 is an illustration of an example aircraft.
Figure 2:
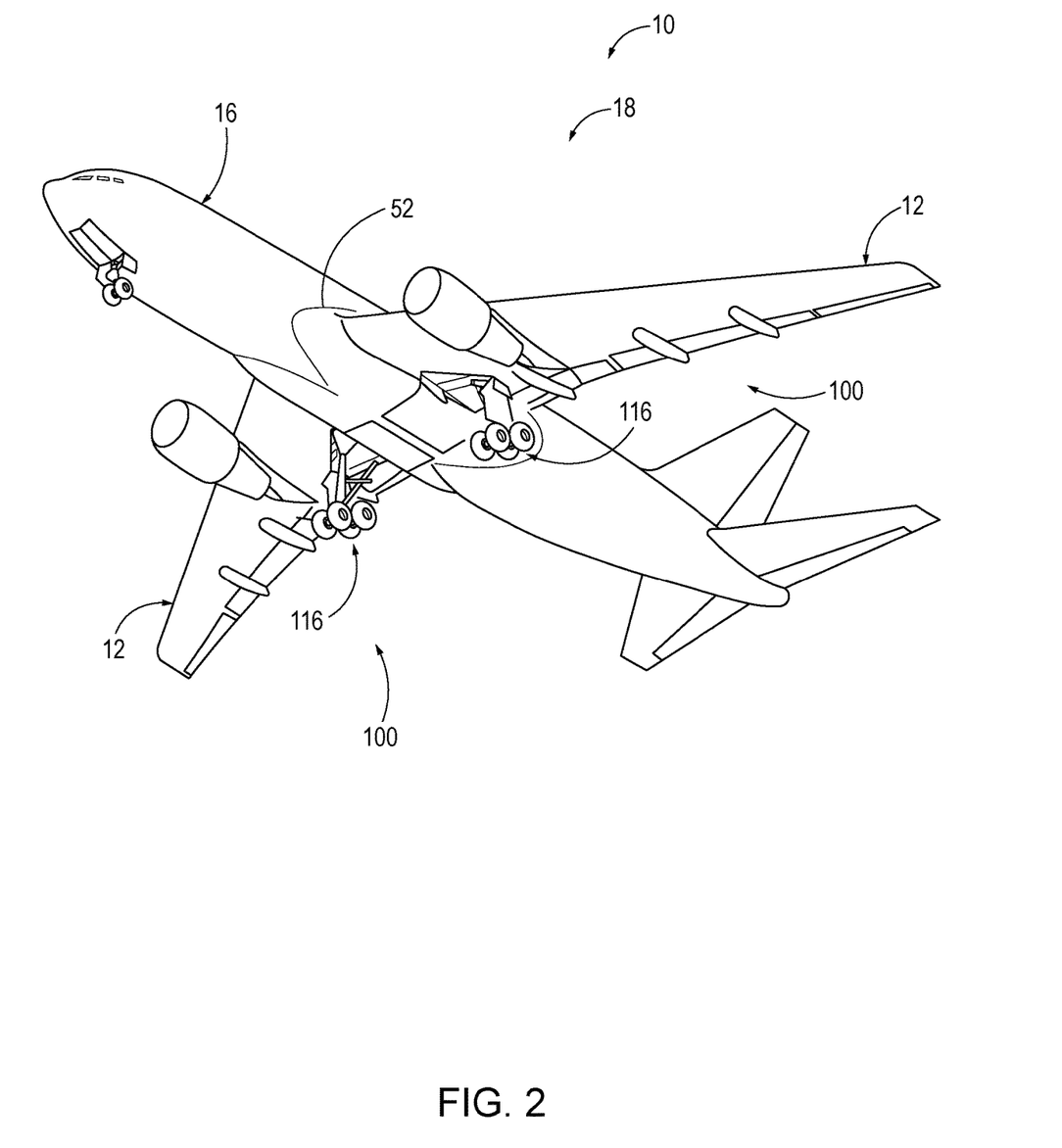
FIG. 2 is another illustration of an example aircraft.
Figure 3:
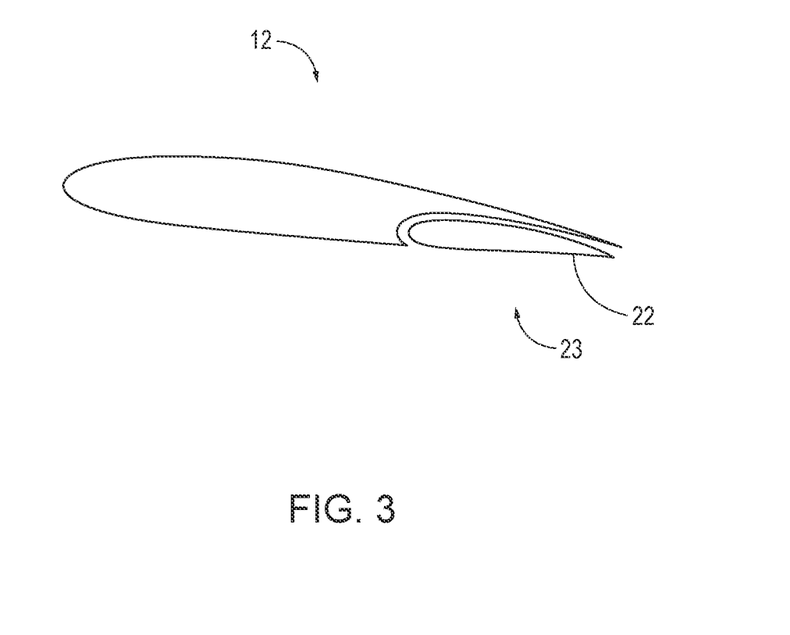
FIG. 3 is a schematic illustration of a wing with a flap in a stowed position.
Figure 4:
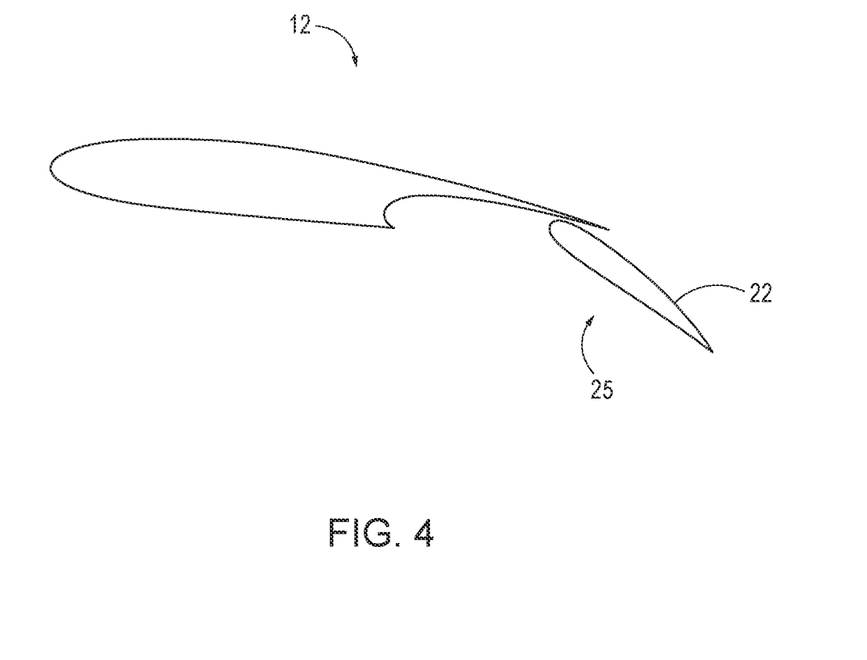
FIG. 4 is a schematic illustration of a wing with a flap in a deployed position.

FIGS. 1 and 2 are schematic representations of aircraft 10 that may comprise wing assemblies 100 according to the present disclosure. While aircraft 10 are depicted as fixed-wing airliners, aircraft 10 and wing assemblies 100 according to the present disclosure are not limited to such examples, and aircraft 10 may be fixed wing aircraft, commercial aircraft, military aircraft, passenger aircraft, autonomous aircraft, rotorcraft, etc. Aircraft 10 typically include wings 12 and a tail 14 that are supported by a fuselage 16 to form and/or define an airframe 18. The wings 12 and the tail 14 include a plurality of flight control surfaces 20, including flaps 22, that are configured to be selectively moved relative to wing support structures 24 of the wings 12 or the tail 14. Flaps 22 are high-lift devices used to reduce the stall speed of an aircraft 10 and thus reduce the take-off and landing distances of an aircraft 10. Flaps 22 are mounted along the trailing edges of the wings 12. In large commercial aircraft, each wing 12 often includes more than one flap 22, including an inboard-most flap 32 positioned adjacent to the fuselage 16 relative to one or more outboard flaps 27. With reference to FIGS. 3 and 4, flaps 22 are configured to be operatively transitioned between a stowed position 23 and a range of deployed positions, such as represented at 25.

Flight control surfaces 20 also may include spoilers 34 positioned adjacent to and/or associated with a corresponding flap 22. Examples of wing support structures 24 include spars, ribs, or other underlying framework of a wing 12 or a tail 14. A flap 22 is operatively coupled to one or more wing support structures 24 by one or more flap supports 28 and is actuated by one or more flap actuators 31 that are operatively coupled between one or more wing support structures 24 and the flap 22. Typically, the flap actuators 31 are associated with a corresponding flap support 28 in close proximity to each other, so that a moment arm between the flap actuator 31 and the flap support 28 and the resulting torque on the flap 22 is minimized when the flap 22 is being actuated.

Historically, in large commercial aircraft, an inboard-most flap 32 may have an inboard flap support 28 and an inboard flap actuator 31 that are both positioned inboard of the flap 22 and internal to the fuselage 16, a wheel well 54, and/or a wing-body fairing 52. This arrangement results in flap actuators that are not evenly spaced along a length of the flap 22 and undesirable torques on the flap 22 during actuation thereof.

Figure 5:
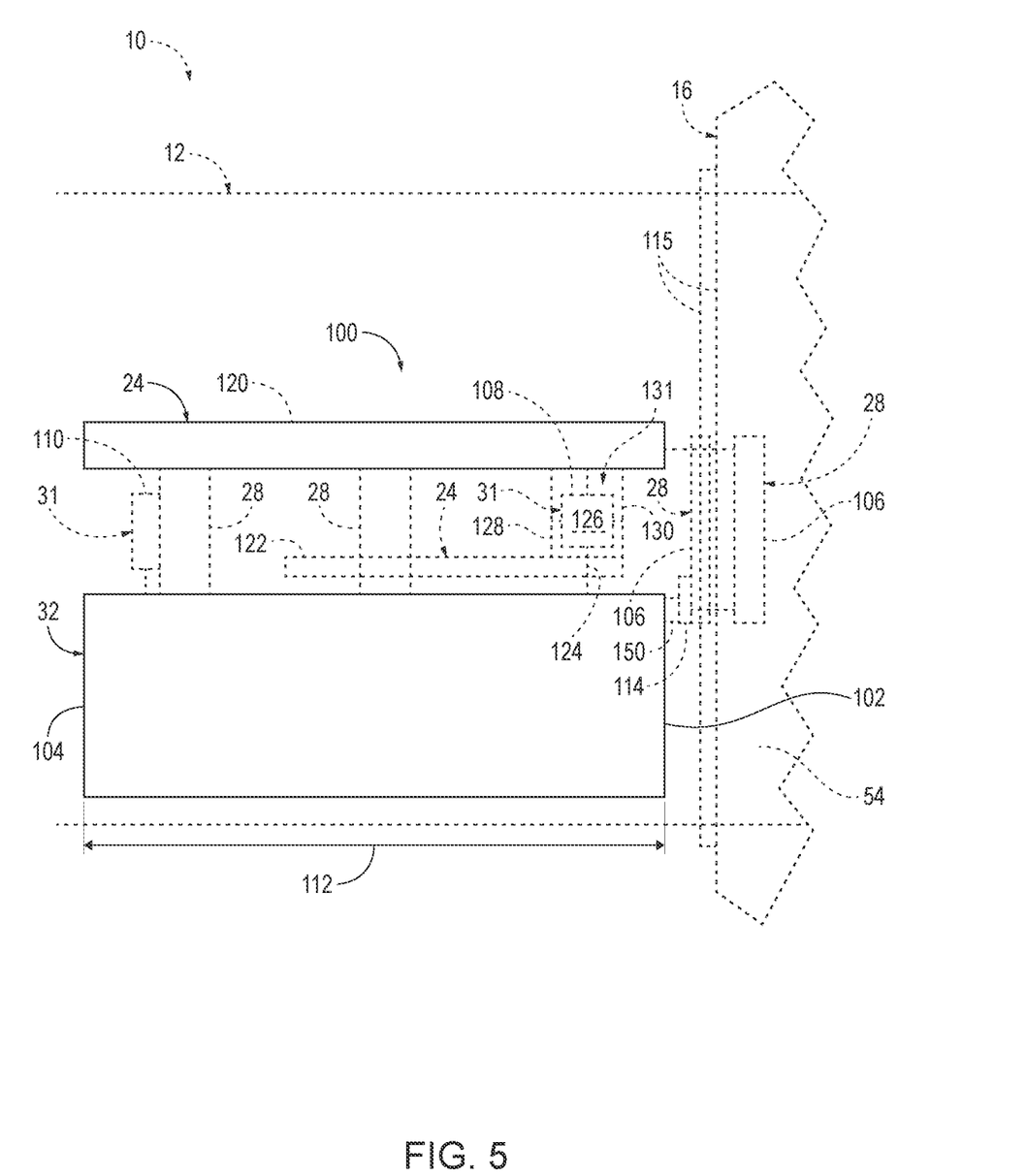
FIG. 5 is a schematic diagram representing wing assemblies and aircraft according to the present disclosure.

Turning now to FIG. 5, wing assemblies 100 and aircraft 10 according to the present disclosure are schematically represented. Generally, in FIG. 5, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 5, wing assemblies 100 comprise at least one or more wing support structures 24, an inboard-most flap 32, one or more flap supports 28, and one or more flap actuators 31. The inboard-most flap 32 comprises an inboard edge 102 and an outboard edge 104. The flap support(s) 28 operatively couple the inboard-most flap 32 to the wing support structure(s) 24, and the flap support(s) 28 comprise at least an inboard-most inboard-flap support 106. The flap actuator(s) 31 are configured to operatively move the inboard-most flap 32 relative to the flap support(s) 28 between a stowed position 23 and a range of deployed positions, as represented in FIGS. 3 and 4. The flap actuator(s) 31 comprise at least an inboard-most inboard-flap actuator 108 that is outboard of the inboard edge 102 of the inboard-most flap 32, and the inboard-most inboard-flap actuator 108 is spaced-away from the inboard-most inboard-flap support 106. In other words, wing assemblies 100 according to the present disclosure do not include an inboard-most flap actuator that is internal to the fuselage 16, the wheel well 54, and/or the wing-body fairing 52 of the aircraft 10. Moreover, the inboard-most inboard-flap actuator 108 of wing assemblies 100 is decoupled from (i.e., is separate and spaced-away from) the inboard-most inboard-flap support 106. However, in some examples of wing assemblies 100, while the inboard-most inboard-flap actuator 108 is not positioned internal to the fuselage 16, the wheel well 54, and/or the wing-body fairing 52 of the aircraft 10, the inboard-most inboard-flap support 106 may be positioned internal to the fuselage 16, the wheel well 54, and/or the wing-body fairing 52 of the aircraft 10, as schematically represented in dashed lines in FIG. 5; however, this is not required in all examples, as also schematically and optionally represented in dashed lines in FIG. 5. By positioning the inboard-most inboard-flap actuator 108 outboard of the inboard edge 102 of the inboard-most flap 32, the locations of the inboard-flap actuators can be more evenly spaced along a spanwise length of the inboard-most flap 32 to optimize, or at least reduce or minimize, undesirable torques applied to the inboard-most flap 32.

An as example, and as schematically and optionally represented in FIG. 5, in some examples, the one or more flap actuators 31 further comprise an outboard-most inboard-flap actuator 110 that is inboard of the outboard edge 104 of the inboard-most flap 32 and that is outboard of the inboard-most inboard-flap actuator 108. The inboard-most flap 32 may be described as having a (spanwise) flap length 112, and the inboard-most inboard-flap actuator 108 may be positioned outboard of the inboard edge 102 by X percentage of the flap length 112, while the outboard-most inboard-flap actuator 110 is positioned inboard of the outboard edge 104 within X±5 percentage of the flap length 112. In other words, in such an arrangement, the inboard-most inboard-flap actuator 108 and the outboard-most inboard-flap actuator 110 may be similarly positioned with respect to the adjacent edges of the inboard-most flap 32, thereby resulting in a somewhat evenly spaced arrangement and application of forces to the inboard-most flap 32. As a more specific example, X may be 10-40 inclusive.

As discussed above, the inboard-most inboard-flap actuator 108 of wing assemblies 100 is decoupled from (i.e., is separate and spaced-away from) the inboard-most inboard-flap support 106. In some examples of wing assemblies, the inboard-most inboard-flap actuator 108 is spaced-away from the inboard-most inboard-flap support 106 by at least 5% of the flap length 112.

In some examples of wing assemblies 100, the wing support structure(s) 24 comprise a landing gear beam 120 that is configured to support a landing gear 116 of an aircraft 10, and the inboard-most inboard-flap actuator 108 is operatively mounted to the landing gear beam 120. In other words, in some wing assemblies 100 and aircraft 10, the landing gear beam 120 is utilized not only to support a landing gear 116 but also to at least partially support the inboard-most inboard-flap actuator 108. Landing gear beams 120 of aircraft 10 tend to be very robust in accordance with the forces experienced during take-off and landing, as well as supporting the weight of the aircraft 10 itself while on the ground. Accordingly, without significant design changes, landing gear beams 120 may be utilized to support and react against the forces of the inboard-most inboard-flap actuator 108.

In some wing assemblies 100, the one or more wing support structures 24 further comprise a spoiler beam 122 that is configured to support a spoiler 34 associated with the inboard-most flap 32. In some such examples, the inboard-most inboard-flap actuator 108 is positioned between the landing gear beam 120 and the spoiler beam 122, as schematically and optionally represented in FIG. 5. In some such examples, the wing assembly 100 further comprises a drive arm 124 that is operatively coupled between the inboard-most inboard-flap actuator 108 and the inboard-most flap 32 to move the inboard-most flap 32 between the stowed position 23 and the range of deployed positions 25, and the drive arm 124 extends through the spoiler beam 122. In some examples, the wing assembly 100 further comprises an inboard inboard-most-actuator support rib 128 and an outboard inboard-most-actuator support rib 130 spaced apart from the inboard inboard-most-actuator support rib 128. In such examples, the inboard-most inboard-flap actuator 108 is operatively mounted to at least one of the inboard inboard-most-actuator support rib 128 and the outboard inboard-most-actuator support rib 130, and the inboard inboard-most-actuator support rib 128 and the outboard inboard-most-actuator support rib 130 are mounted to the landing gear beam 120 and to the spoiler beam 122. That is, the support ribs 128, 130, the landing gear beam 120, and the spoiler beam 122, define a volume 131, within which at least a portion of the inboard-most inboard-flap actuator 108 is positioned. In some examples, the drive arm 124 extends from the volume 131, through the spoiler beam 122, to the inboard-most flap 32. That is, in some examples, the drive arm 124 extends from between the inboard inboard-most-actuator support rib 128 and the outboard inboard-most-actuator support rib 130.

In some examples, the inboard-most inboard-flap actuator 108 is a rotary actuator 126. For various reasons, historically, rotary actuators have not been used to actuate flaps. However, because of their size and orientation, rotary actuators 126 may be positioned in compact volumes, such as between the landing gear beam 120 and the spoiler beam 122 without significant redesign of these components being needed, thereby providing for a much more compact flap assembly and overall wing in the chord-wise direction.

As discussed and as schematically and optionally represented in FIG. 5, while the inboard-most inboard-flap actuator 108 of wing assemblies 100 is positioned outboard of the inboard edge 102 of the inboard-most flap 32, in some examples, the inboard-most inboard-flap support 106 is positioned inboard of the inboard edge 102 of the inboard-most flap 32. For example, the inboard-most inboard-flap support 106 may be positioned within the fuselage 16, within a wheel well 54 of the fuselage, or within a wing-body fairing 52. Such arrangements may offer lower weight and lower cost solutions. In particular, the fuselage and wheel well provide robust structures for supporting an inboard-most inboard-flap support 106.

In other examples and as also schematically and optionally represented in FIG. 5, the inboard-most inboard-flap support 106 is not positioned internal to the fuselage 16, a wheel well 54, or a wing-body fairing 52, and the inboard-most inboard-flap support 106 comprises at least one track 114 that is integral with or fixed to an outboard side 115 of the fuselage 16 or a wing-body fairing 52. In such examples, the inboard-most flap 32 is operatively engaged with the at least one track 114. For example, the inboard-most flap 32 may comprise at least one roller 150 that extends inboard from the inboard edge 102 of the inboard-most flap 32, with the roller(s) 150 being operatively engaged with the track(s) 114.

In yet other examples and as schematically and optionally represented in FIG. 5, wing assemblies 100 further comprise a limiting structure 118 that is positioned to restrict the inboard-most flap 32 from pivoting upward relative to the stowed position 23. That is, the limiting structure may prevent the inboard-most flap 32 from pivoting beyond the stowed position 23 as a result of aerodynamic forces during flight, which otherwise could result in undesirable aerodynamic characteristics of the wing. Moreover, the flap actuators 31 associated with the inboard-most flap 32 may not receive undesirable forces as a result of the inboard-most flap 32 being urged beyond its stowed position 23, thereby resulting in less maintenance of the flap actuators 31.

In some examples, the limiting structure 118 is integral with or fixed to an outboard side 115 of a fuselage 16 or a wing-body fairing 52. In some examples, the limiting structure 118 is an aerodynamic structure, that is, it is generally exposed to the flow of air during flight of the aircraft 10.

Turning now to FIGS. 6-10, illustrative non-exclusive examples of wing assemblies 100 are illustrated. Where appropriate, the reference numerals from the schematic illustration of FIG. 5 are used to designate corresponding parts of the examples of FIGS. 6-10; however, the examples of FIGS. 6-10 are non-exclusive and do not limit wing assemblies 100 to the illustrated embodiments of FIGS. 6-10. That is, wing assemblies 100 may incorporate any number of the various aspects, configurations, characteristics, properties, etc. of wing assemblies 100 that are illustrated in and discussed with reference to the schematic representations of FIG. 5 and/or the embodiments of FIGS. 6-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 6-10.

Figure 6:
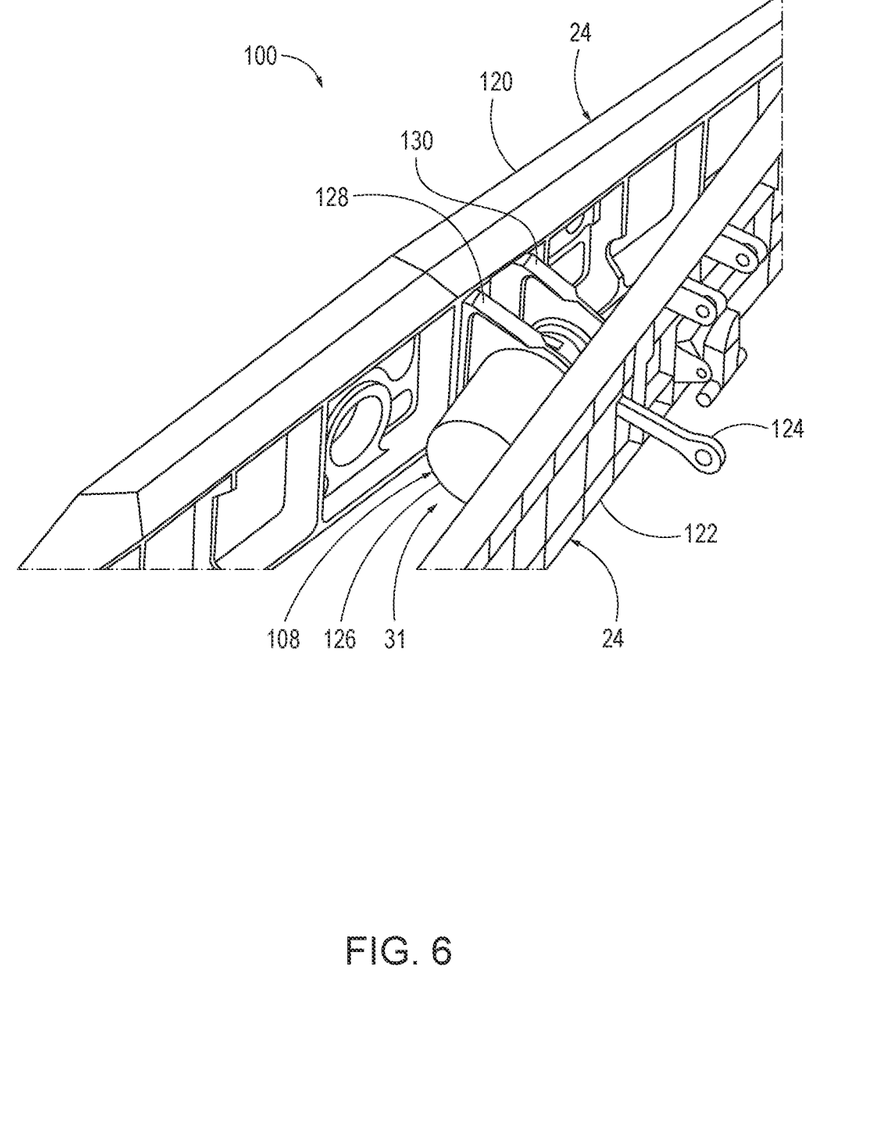
FIG. 6 illustrates a portion of an example wing assembly according to the present disclosure.

FIG. 6 illustrates select components of an example wing assembly 100, as shown from a top rear perspective of the wing assembly 100, in which the inboard-most inboard-flap actuator 108 is a rotary actuator 126 and positioned between a landing gear beam 120 and a spoiler beam 122. The example wing assembly 100 of FIG. 6 also comprises an inboard inboard-most-actuator support rib 128 and an outboard inboard-most-actuator support rib 130 mounted to and between the landing gear beam 120 and to the spoiler beam 122. The drive arm 124 associated with the rotary actuator 126 extends from between support ribs 128, 130 and through the spoiler beam 122 for operative connection to the inboard-most flap 32 (not pictured).

Figure 7:
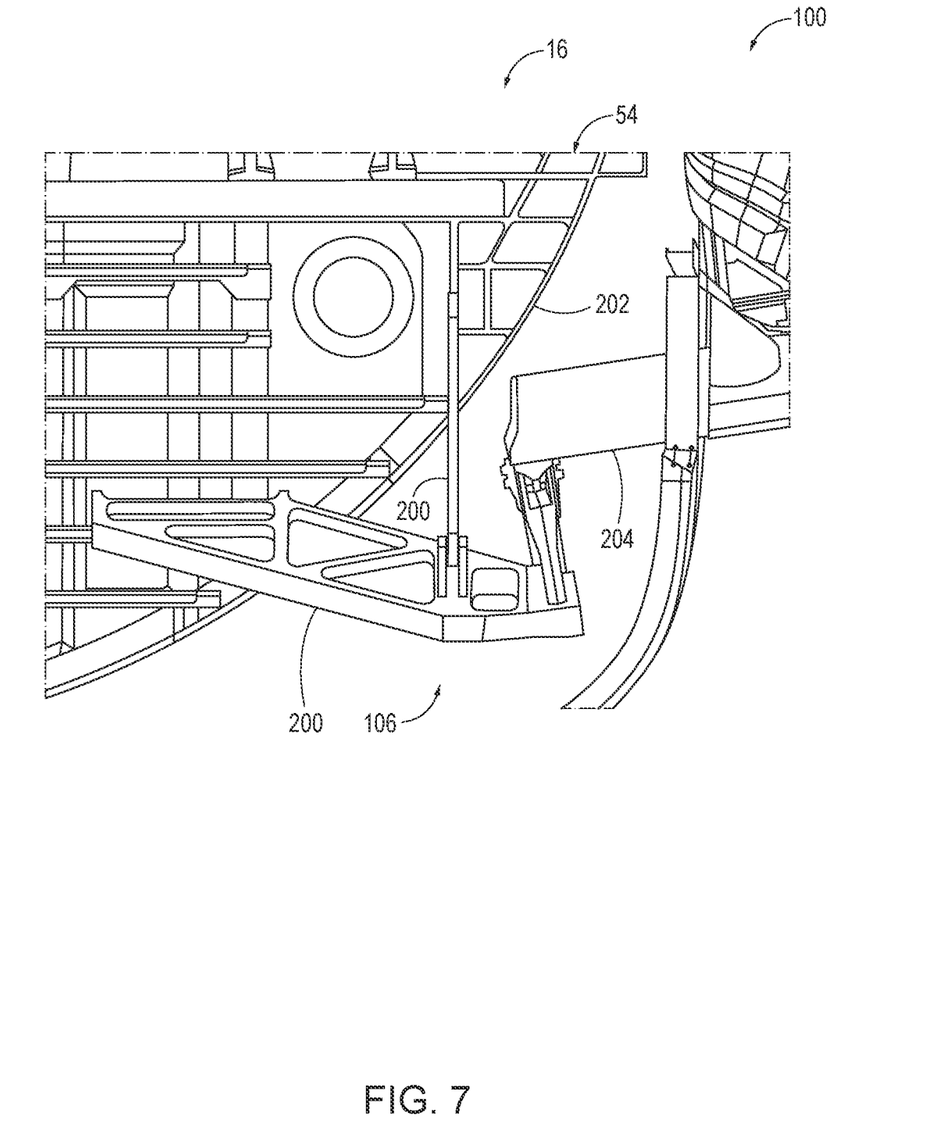
FIG. 7 illustrates a portion of an example wing assembly according to the present disclosure.

FIG. 7 partially illustrates another example wing assembly 100, shown from a front view, in which the inboard-most inboard-flap support 106 is positioned within the wheel well 54 of the fuselage 16. More specifically, in the example of FIG. 7, the inboard-most inboard-flap support 106 comprises support beams 200 that are mounted to a bulkhead 202 of the wheel well 54, and a tube extension 204 extending inboard of the inboard-most flap 32 (not pictured) and pivotally coupled to the lower of the two support beams 200. Accordingly, when the inboard-most flap 32 is actuated, the tube extension 204 pivots about the lower of the two support beams 200. Aspects of the example wing assembly 100 of FIG. 7 may utilized with the example wing assembly 100 of FIG. 6, and vice versa.

Figure 8:
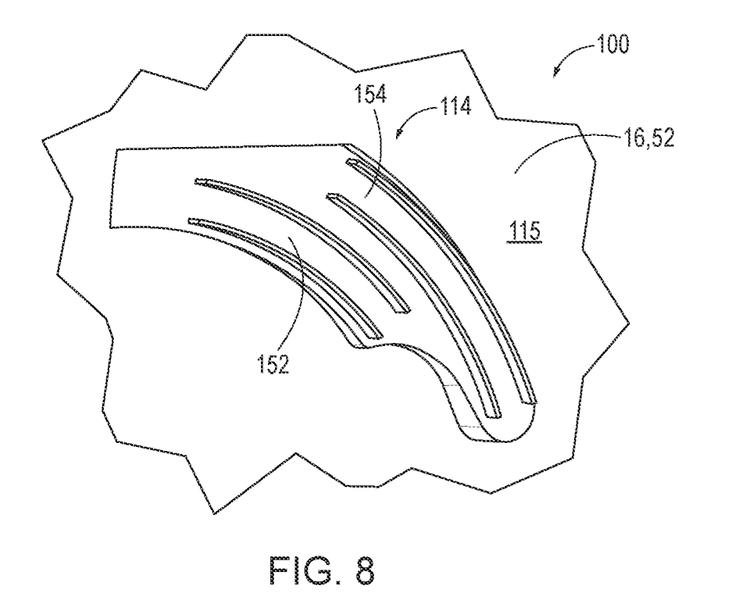
FIG. 8 illustrates a portion of an example wing assembly according to the present disclosure, including a track.
Figure 9:
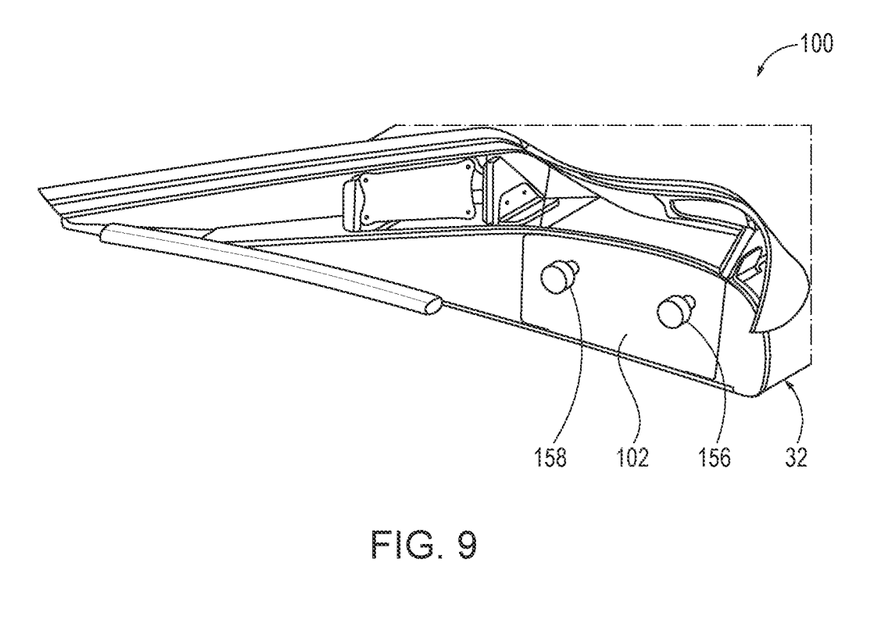
FIG. 9 illustrates another portion of the example wing assembly of FIG. 8, including a flap with rollers that engage the track.

FIGS. 8 and 9 illustrate components of another example wing assembly 100 comprising a forward track 152 and an aft track 154 integral with or fixed to an outboard side 115 of the fuselage 16 or a wing-body fairing 52. The inboard-most flap 32 comprises a forward roller 156 that operatively engages with the forward track 152 and an aft roller 158 that operatively engages with the aft track 154. Accordingly, when the inboard-most flap 32 moves between the stowed position 23 and the range of deployed positions 25, the tracks 152, 154 constrain the path of the inboard-most flap 32 and bear a load via the rollers 156, 158. Aspects of the example wing assembly 100 of FIGS. 8 and 9 may utilized with the example wing assembly 100 of FIG. 6, and vice versa.

Figure 10:
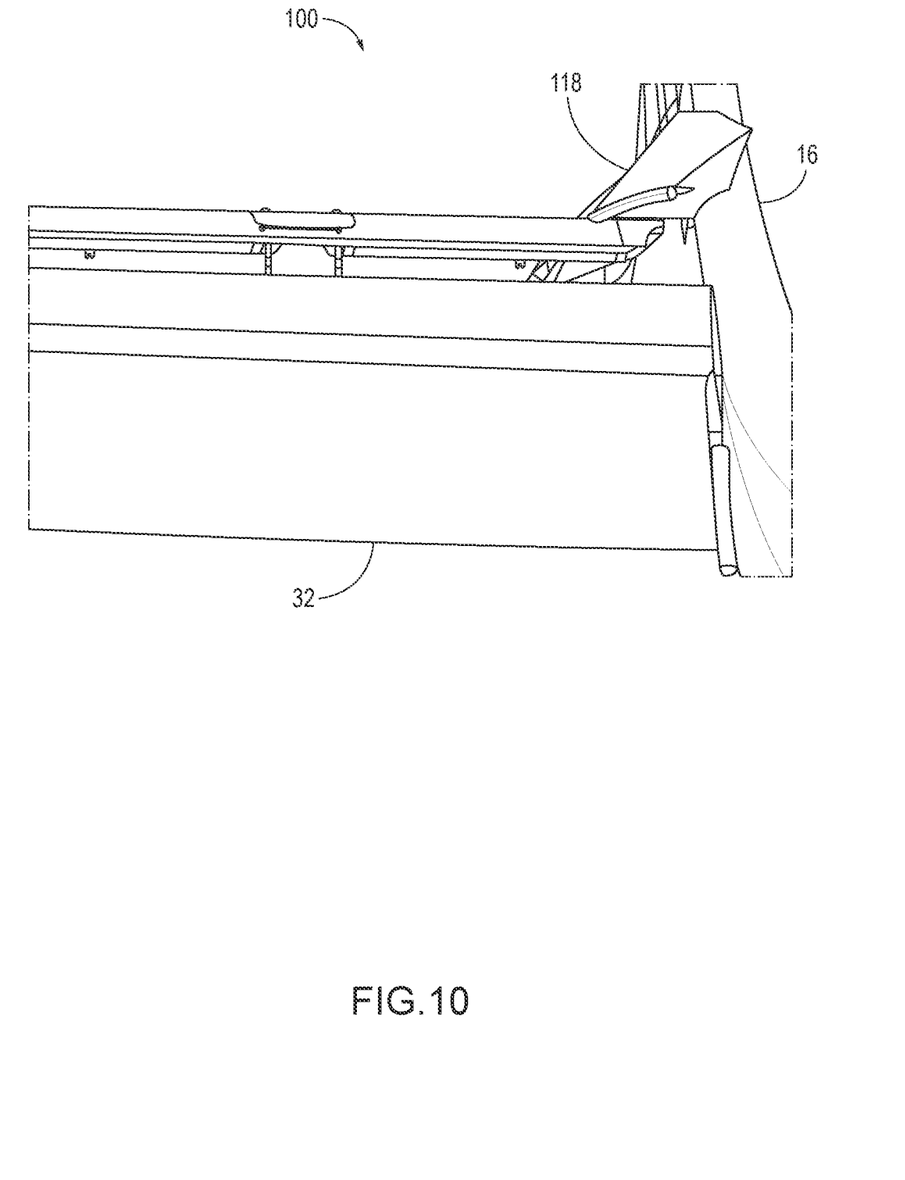
FIG. 10 illustrates an example wing assembly according to the present disclosure.

FIG. 10 illustrates components of another example wing assembly 100, shown from a rear view, comprising an aerodynamic limiting structure 118 that is positioned to restrict the inboard-most flap 32 from pivoting upward relative to the stowed position 23. The limiting structure 118 restricts the inboard-most flap 32 from pivoting upward beyond its stowed position, such as otherwise might occur as a result of aerodynamic forces or vibrations and potentially result in fatiguing of the flap actuators 31. That is, inclusion of the limiting structure 118 limits the undesirable fatiguing of the flap actuators 31. Aspects of the example wing assembly 100 of FIG. 10 may be utilized with the example wing assemblies 100 of FIGS. 6-9, and vice versa.

Illustrative, non-exclusive examples of inventive subject matter according to the present disclosure are described in the following enumerated paragraphs:

A. A wing assembly (100) for an aircraft (10), the wing assembly (100) comprising:
  one or more wing support structures (24);
  an inboard-most flap (32) comprising an inboard edge (102) and an outboard edge (104);
  one or more flap supports (28) that operatively couple the inboard-most flap (32) to the one or more wing support structures (24), wherein the one or more flap supports (28) comprise at least an inboard-most inboard-flap support (106); and
  one or more flap actuators (31) configured to operatively move the inboard-most flap (32) relative to the one or more flap supports (28) between a stowed position (23) and a range of deployed positions (25), wherein the one or more flap actuators (31) comprise at least an inboard-most inboard-flap actuator (108) that is outboard of the inboard edge (102) of the inboard-most flap (32), and wherein the inboard-most inboard-flap actuator (108) is spaced-away from the inboard-most inboard-flap support (106).

A1. The wing assembly (100) of paragraph A,
  wherein the one or more flap actuators (31) further comprise an outboard-most inboard-flap actuator (110) that is inboard of the outboard edge (104) of the inboard-most flap (32) and that is outboard of the inboard-most inboard-flap actuator (108);
  wherein the inboard-most flap (32) has a flap length (112), wherein the inboard-most inboard-flap actuator (108) is positioned outboard of the inboard edge (102) by X percentage of the flap length (112), and wherein the outboard-most inboard-flap actuator (110) is positioned inboard of the outboard edge (104) within X±5 percentage of the flap length (112).

A1.1. The wing assembly (100) of paragraph A1, wherein X is 10-40 inclusive.

A2. The wing assembly (100) of any of paragraphs A-A1.1, wherein the inboard-most flap (32) has a/the flap length (112), and wherein the inboard-most inboard-flap actuator (108) is spaced-away from the inboard-most inboard-flap support (106) by at least 5% of the flap length (112).

A3. The wing assembly (100) of any of paragraphs A-A2, wherein the one or more wing support structures (24)

comprise a landing gear beam (120) configured to support a landing gear (116), and wherein the inboard-most inboard-flap actuator (108) is operatively mounted to the landing gear beam (120).

A3.1. The wing assembly (100) of paragraph A3, wherein the one or more wing support structures (24) further comprise a spoiler beam (122) configured to support a spoiler (34), and wherein the inboard-most inboard-flap actuator (108) is positioned between the landing gear beam (120) and the spoiler beam (122).

A3.1.1. The wing assembly (100) of paragraph A3.1, wherein the wing assembly (100) further comprises a drive arm (124) operatively coupled between the inboard-most inboard-flap actuator (108) and the inboard-most flap (32) to move the inboard-most flap (32) between the stowed position (23) and the range of deployed positions (25), and wherein the drive arm (124) extends through the spoiler beam (122).

A3.1.2. The wing assembly (100) of any of paragraphs A3.1-A3.1.1, further comprising an inboard inboard-most-actuator support rib (128) and an outboard inboard-most-actuator support rib (130) spaced apart from the inboard inboard-most-actuator support rib (128), wherein the inboard-most inboard-flap actuator (108) is operatively mounted to at least one of the inboard inboard-most-actuator support rib (128) and the outboard inboard-most-actuator support rib (130), and wherein the inboard inboard-most-actuator support rib (128) and the outboard inboard-most-actuator support rib (130) are mounted to the landing gear beam (120) and to the spoiler beam (122).

A3.1.2.1. The wing assembly (100) of paragraph A3.1.2 when depending from paragraph A3.1.1, wherein the drive arm (124) extends from between the inboard inboard-most-actuator support rib (128) and the outboard inboard-most-actuator support rib (130).

A4. The wing assembly (100) of any of paragraphs A-A3.1.2.1, wherein the inboard-most inboard-flap actuator (108) is a rotary actuator (126).

A5. The wing assembly (100) of any of paragraphs A-A4, wherein the inboard-most inboard-flap support (106) is positioned inboard of the inboard edge (102) of the inboard-most flap (32).

A5.1. The wing assembly (100) of paragraph A5.1, wherein the inboard-most inboard-flap support (106) is positioned within a fuselage (16) of the aircraft (10), a wheel well (54) of the fuselage (16), or a wing-body fairing (52).

A6. The wing assembly (100) of any of paragraphs A-A4, wherein the inboard-most inboard-flap support (106) comprises at least one track (114) integral with or fixed to an outboard side (115) of a fuselage (16) of the aircraft (10) or a wing-body fairing (52), and wherein the inboard-most flap (32) is operatively engaged with the at least one track (114).

A6.1. The wing assembly (100) of paragraph A6, wherein the inboard-most flap (32) comprises at least one roller (150) extending inboard from the inboard edge (102) of the inboard-most flap (32), wherein the at least one roller (150) is operatively engaged with the at least one track (114).

A6.1.1. The wing assembly (100) of paragraph A6.1, wherein the at least one track (114) comprises a forward track (152) and an aft track (154), and wherein the at least one roller (150) comprises a forward roller (156) operatively engaged with the forward track (152) and an aft roller (158) operatively engaged with the aft track (154).

A7. The wing assembly (100) of any of paragraphs A-A6.1.1, further comprising a limiting structure (118) positioned to restrict the inboard-most flap (32) from pivoting upward relative to the stowed position (23).

A7.1. The wing assembly (100) of paragraph A7, wherein the limiting structure (118) is integral with or fixed to an/the outboard side (115) of a/the fuselage (16) or a/the wing-body fairing (52).

A7.2. The wing assembly (100) of any of paragraphs A7-A7.1, wherein the limiting structure (118) is an aerodynamic structure.

A8. An aircraft (10), comprising:
the wing assembly (100) of any of paragraphs A-A7.2;
a wing (12) comprising the wing assembly (100); and
a/the fuselage (16), wherein the fuselage (16) supports the wing (12).

A8.1. The aircraft (10) of paragraph A8, further comprising one or more of a/the wheel well (54) of the fuselage or a/the wing-body fairing (52).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:
1. A wing assembly for an aircraft, the wing assembly comprising:

one or more wing support structures;
an inboard-most flap comprising an inboard edge and an outboard edge;
one or more flap supports that operatively couple the inboard-most flap to the one or more wing support structures, wherein the one or more flap supports comprise at least an inboard-most inboard-flap support, a landing gear beam configured to support a landing gear, and a spoiler beam configured to support a spoiler; and
one or more flap actuators configured to operatively move the inboard-most flap relative to the one or more flap supports between a stowed position and a range of deployed positions, wherein the one or more flap actuators comprise at least an inboard-most inboard-flap actuator that is outboard of the inboard edge of the inboard-most flap, and wherein the inboard-most inboard-flap actuator is spaced-away from the inboard-most inboard-flap support, is operatively mounted to the landing gear beam, and is positioned between the landing gear beam and the spoiler beam.

2. The wing assembly of claim 1,
wherein the one or more flap actuators further comprise an outboard-most inboard-flap actuator that is inboard of the outboard edge of the inboard-most flap and that is outboard of the inboard-most inboard-flap actuator; and
wherein the inboard-most flap has a flap length, wherein the inboard-most inboard-flap actuator is positioned outboard of the inboard edge by X percentage of the flap length, and wherein the outboard-most inboard-flap actuator is positioned inboard of the outboard edge within X±5 percentage of the flap length.

3. The wing assembly of claim 2, wherein X is 10-40 inclusive.

4. The wing assembly of claim 1, wherein the inboard-most flap has a flap length, and wherein the inboard-most inboard-flap actuator is spaced-away from the inboard-most inboard-flap support by at least 5% of the flap length.

5. The wing assembly of claim 1, wherein the wing assembly further comprises a drive arm operatively coupled between the inboard-most inboard-flap actuator and the inboard-most flap to move the inboard-most flap between the stowed position and the range of deployed positions, and wherein the drive arm extends through the spoiler beam.

6. The wing assembly of claim 1, further comprising an inboard inboard-most-actuator support rib and an outboard inboard-most-actuator support rib spaced apart from the inboard inboard-most-actuator support rib, wherein the inboard-most inboard-flap actuator is operatively mounted to at least one of the inboard inboard-most-actuator support rib and the outboard inboard-most-actuator support rib, and wherein the inboard inboard-most-actuator support rib and the outboard inboard-most-actuator support rib are mounted to the landing gear beam and to the spoiler beam.

7. The wing assembly of claim 6, wherein the wing assembly further comprises a drive arm operatively coupled between the inboard-most inboard-flap actuator and the inboard-most flap to move the inboard-most flap between the stowed position and the range of deployed positions, wherein the drive arm extends through the spoiler beam, and wherein the drive arm extends between the inboard inboard-most-actuator support rib and the outboard inboard-most-actuator support rib.

8. The wing assembly of claim 1, wherein the inboard-most inboard-flap actuator is a rotary actuator.

9. The wing assembly of claim 1, wherein the inboard-most inboard-flap support is positioned inboard of the inboard edge of the inboard-most flap.

10. The wing assembly of claim 9, wherein the inboard-most inboard-flap support is positioned within a fuselage of the aircraft, a wheel well of the fuselage, or a wing-body fairing.

11. The wing assembly of claim 1, wherein the inboard-most inboard-flap support comprises at least one track integral with or fixed to an outboard side of a fuselage of the aircraft or a wing-body fairing, and wherein the inboard-most flap is operatively engaged with the at least one track.

12. The wing assembly of claim 11, wherein the inboard-most flap comprises at least one roller extending inboard from the inboard edge of the inboard-most flap, wherein the at least one roller is operatively engaged with the at least one track.

13. The wing assembly of claim 12, wherein the at least one track comprises a forward track and an aft track, and wherein the at least one roller comprises a forward roller operatively engaged with the forward track and an aft roller operatively engaged with the aft track.

14. The wing assembly of claim 1, further comprising a limiting structure positioned to restrict the inboard-most flap from pivoting upward relative to the stowed position.

15. The wing assembly of claim 14, wherein the limiting structure is integral with or fixed to an outboard side of a fuselage of the aircraft or a wing-body fairing.

16. The wing assembly of claim 14, wherein the limiting structure is an aerodynamic structure.

17. An aircraft, comprising:
the wing assembly of claim 1;
a wing comprising the wing assembly; and
a fuselage, wherein the fuselage supports the wing.

18. The wing assembly of claim 1, further comprising an inboard inboard-most-actuator support rib and an outboard inboard-most-actuator support rib, and wherein the inboard-most inboard-flap actuator is arranged within a volume defined by the inboard inboard-most-actuator support rib, the outboard inboard-most-actuator support rib, the spoiler beam, and the landing gear beam.

19. The wing assembly of claim 18, wherein the inboard-most inboard-flap actuator is a rotary actuator, and
further comprising a drive arm operatively coupled between the rotary actuator and the inboard-most flap, wherein the drive arm extends between the inboard inboard-most-actuator support rib and the outboard inboard-most-actuator support rib.

20. A wing assembly for an aircraft, the wing assembly comprising:
one or more wing support structures;
an inboard-most flap comprising an inboard edge and an outboard edge;
one or more flap supports that operatively couple the inboard-most flap to the one or more wing support structures, wherein the one or more flap supports comprise at least an inboard-most inboard-flap support; and
one or more flap actuators configured to operatively move the inboard-most flap relative to the one or more flap supports between a stowed position and a range of deployed positions, wherein the one or more flap actuators comprise at least an inboard-most inboard-flap actuator that is outboard of the inboard edge of the inboard-most flap, and wherein the inboard-most inboard-flap actuator is spaced-away from the inboard-most inboard-flap support;

wherein the one or more flap actuators further comprise an outboard-most inboard-flap actuator that is inboard of the outboard edge of the inboard-most flap and that is outboard of the inboard-most inboard-flap actuator;

wherein the inboard-most flap has a flap length, wherein the inboard-most inboard-flap actuator is positioned outboard of the inboard edge by X percentage of the flap length, and wherein the outboard-most inboard-flap actuator is positioned inboard of the outboard edge within X±5 percentage of the flap length, and wherein X is 10-40 inclusive;

wherein the inboard-most inboard-flap actuator is spaced-away from the inboard-most inboard-flap support by at least 5% of the flap length;

wherein the one or more wing support structures comprise a landing gear beam configured to support a landing gear, and wherein the inboard-most inboard-flap actuator is operatively mounted to the landing gear beam;

wherein the one or more wing support structures further comprise a spoiler beam configured to support a spoiler, and wherein the inboard-most inboard-flap actuator is positioned between the landing gear beam and the spoiler beam;

wherein the wing assembly further comprises a drive arm operatively coupled between the inboard-most inboard-flap actuator and the inboard-most flap to move the inboard-most flap between the stowed position and the range of deployed positions, and wherein the drive arm extends through the spoiler beam; and wherein the wing assembly further comprises an inboard inboard-most-actuator support rib and an outboard inboard-most-actuator support rib spaced from the inboard inboard-most-actuator support rib, wherein the inboard-most inboard-flap actuator is operatively mounted to at least one of the inboard inboard-most-actuator support rib and the outboard inboard-most-actuator support rib, wherein the inboard inboard-most-actuator support rib and the outboard inboard-most-actuator support rib are mounted to the landing gear beam and to the spoiler beam, and wherein the drive arm extends from between the inboard inboard-most-actuator support rib and the outboard inboard-most-actuator support rib.

\* \* \* \* \*